United States Patent

Fujii et al.

[11] Patent Number: 5,437,943
[45] Date of Patent: Aug. 1, 1995

[54] POSITIVE ELECTRODE AND SECONDARY BATTERY USING THE SAME

[75] Inventors: Toshishige Fujii, Yokohama; Okitoshi Kimura, Tokyo; Toshiyuki Ohsawa, Kawasaki; Toshiyuki Kabata, Machida; Nobuo Katagiri, Yokohama, all of Japan

[73] Assignee: Ricoh Company, Ltd., Tokyo, Japan

[21] Appl. No.: 117,286

[22] Filed: Sep. 7, 1993

[30] Foreign Application Priority Data

| Sep. 4, 1992 | [JP] | Japan | 4-263078 |
| Nov. 18, 1992 | [JP] | Japan | 4-332508 |
| Feb. 4, 1993 | [JP] | Japan | 5-040491 |
| Apr. 28, 1993 | [JP] | Japan | 5-103015 |
| May 6, 1993 | [JP] | Japan | 5-129997 |

[51] Int. Cl.⁶ ............... H01M 4/60; H01M 10/40
[52] U.S. Cl. ............... 429/192; 429/213
[58] Field of Search ............... 429/213, 218, 192, 194, 429/212, 217, 232, 191, 209, 217

[56] References Cited

U.S. PATENT DOCUMENTS

| 4,906,538 | 3/1990 | Toyosawa et al. | 429/213 X |
| 4,948,685 | 8/1990 | Ohsawa et al. | 429/213 |
| 5,037,713 | 8/1991 | Yoshino et al. | 429/218 X |
| 5,066,556 | 11/1991 | Toyosawa et al. | 429/194 |
| 5,108,855 | 4/1992 | Daifuku et al. | 429/213 X |

*Primary Examiner*—Anthony Skapars
*Attorney, Agent, or Firm*—Oblon, Spivak, McClelland, Maier & Neustadt

[57] ABSTRACT

A positive electrode is composed of a film-shaped active material, which is composed of a conducting polymer serving as a first active material, and an electrochemical active material serving as a second active material which is uniformly dispersed in the shape of particles in the conducting polymer, with the parts-by-weight ratio of the second active material to the first active material being 3 to 9 parts of the second active material to 7 to 1 part of the first active material, when the total of the first active material and the second active material is 10 parts. A secondary battery is fabricated using the above positive electrode.

23 Claims, 1 Drawing Sheet

FIG. I
PRIOR ART
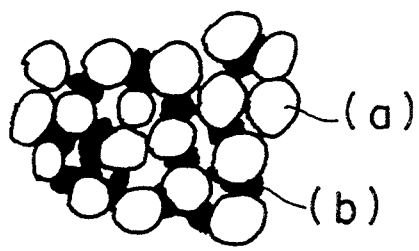
FIG. 2
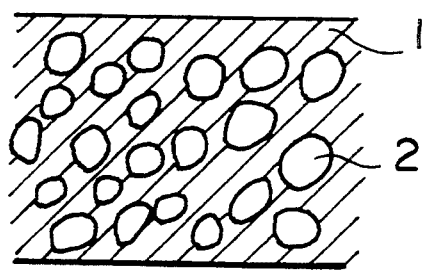

POSITIVE ELECTRODE AND SECONDARY BATTERY USING THE SAME

BACKGROUND OF THE INVENTION

1. Field of the Invention

The present invention relates to a positive electrode comprising a film-shaped composite active material, which comprises a conducting polymer serving as a first active material, and an electrochemical active material serving as a second active material which is uniformly dispersed in the shaped of particles in the conducting polymer, with the parts-by-weight ratio of the second active material to the first active material being 3 to 9 parts of the second active material to 7 to 1 part of the first active material when the total of the first active material and the second active material is 10 parts. The present invention also relates to a secondary battery in which the above-mentioned positive electrode is used.

2. Discussion of Background

Recent development of small, thin, and light electric appliances is remarkable, particularly in the field of office automation. In accordance with the development of such small, thin and light electric appliances, a secondary battery with higher performance capable of supporting the appliances is demanded.

Under such circumstances, a lithium secondary battery has been rapidly developed as a battery with high energy density, by which conventional lead acid storage batteries and nickel cadmium storage batteries will be eventually replaced.

Hereinafter, an active material which has been worked so as to be provided with predetermined functions for use in a battery is referred to as an electrode. Of a pair of electrodes used in a battery, an electrode on an electrochemically higher potential side is referred to as a positive electrode, while an electrode on an electrochemically lower potential side is referred to as a negative electrode.

As an active material for use in a positive electrode (hereinafter referred to as the positive electrode active material) for such a lithium secondary battery, transition metal chalcogenides such as $TiS_2$, $MoS_2$, $CoO_2$, $V_2O_5$, $FeS_2$, $NbS_2$, $ZrS_2$, $VSe_2$, and $MnO_2$ are used. Many secondary batteries using such an inorganic material as an active material have been studied.

When such inorganic materials are used as active materials, it is possible to perform a reversible, electrochemical intercalation of lithium ions into and deintercalation thereof from the structure of these inorganic materials. By utilizing this property of the above inorganic active materials, conventional secondary batteries have been developed.

Generally, lithium secondary batteries using the above-mentioned inorganic materials as positive electrode active materials have high energy density because those positive active materials themselves have high densities. Furthermore, since charging is carried out by the deintercalation of lithium ions from the crystalline structure of the above positive electrode active material, and discharging is carried out by the intercalation of lithium ions into the crystalline structure of the positive electrode active material, the battery has an excellent voltage plateau in a discharge curve of an electrode of the battery or in a discharge curve of the battery. However, the diffusion rate of the cations throughout the active material during the electrode reactions at the charging and discharging of the battery is so small that the voltage thereof quickly drops, and fast charging and heavy load discharging properties are apt to be impaired.

In addition, many of the above-mentioned conventionally employed inorganic active materials are generally poor in workability and have insufficient electroconductivities for use in practice, so that when such inorganic active materials are used in a positive electrode, a binder agent and an electroconductive auxiliary agent for imparting electroconductivity to the inorganic materials are generally added.

Such a binder agent for use with the inorganic active materials is required to satisfy the following conditions: (1) being insoluble in an electrolytic solution; (2) having high melting point, and not uniformly miscible with the inorganic active materials; and (3) being sufficiently finely divided particles for use with the inorganic active materials.

As the materials for such a binder agent, polyolefin polymers such as polyethylene, and Teflon are currently used.

As illustrated in FIG. 1, an inorganic active material (a) is fixed with a polyolefin binder agent (b), and electric collection is carried out by an electroconductive auxiliary agent such as acetylene black (not shown) which is interposed between the particles of the inorganic active material.

The above-mentioned polyolefin binder agent (b) does not have a function as an active material. Therefore, when charging and discharging are repeated, that is, when the intercalation of cations into the crystals of the inorganic active material and the deintercalation thereof from the crystals of the inorganic active material are repeated, the polyolefin binder agent (b) lowers not only the efficiency of the intercalation and deintercalation of the cations, but also the energy density per unit weight or unit volume of the active material.

Recently during the development of lithium secondary batteries using such inorganic materials as positive electrode active materials, conducting polymers have been discovered which can perform an electrode reaction by carrying out reversible doping and undoping of an anion and therefore can be used as a positive electrode active material for a lithium secondary battery.

Examples of such conducting polymers so far reported are polyacetylene (refer to, for example, Japanese Laid-Open Patent Application 56-136489), polypyrrole (refer to, for example, the 25th Battery Symposium, Abstracts, P2561.1989), and polyaniline (refer to, for example, the 50th Convention of Electric Science Association, Abstracts, P2281.1984).

Such conducting polymers have the advantages over conventionally employed inorganic materials that they are light, exhibit high power density, excellent electric collection performance due to the electroconductivity thereof, and high cycle characteristics for a 100% depth of discharge, and are also excellent in workability for the fabrication of an electrode.

However, as the research and development of the conducting polymers have proceeded, several shortcomings have also been discovered. For instance, the volume energy density cannot be sufficiently increased because of the low densities thereof, and since the ions which are doped into or undoped from the conducting polymers are supplied from the electrolytic ions in an electrolytic solution, a larger amount of an electrolytic solution is required in comparison with the case where a lithium-intercalation type positive electrode is employed, so that the obtained energy density per unit volume thereof is unexpectedly insufficient for practical use in a battery system.

In order to solve these problems, there is proposed, for instance, in Japanese Laid-Open Patent Application 63-102162 a method of making best use of the advantages of the above-mentioned inorganic active materials and conducting polymers by mutually making up for the respective disadvantages thereof, and fabricating a composite electrode comprising a conducting polymer and an inorganic active material.

In the above Japanese Laid-Open Patent Application, the following procedures (1) and (2) for fabricating the composite electrode are proposed:

(1) a powder-like conducting polymer and a powder-like inorganic active material are mixed in a predetermined ratio with the addition of a binder agent thereto to prepare a mixture of these components. This mixture, with the application of pressure thereto, is molded into a composite electrode provided on a collector; and (2) an electrconductive monomer is chemically or electrochemically polymerized in the presence of a powder-like inorganic active material, so that a composite electrode is fabricated, which comprises a polymer into which the inorganic active material is incorporated.

In the above-mentioned method (1), since the mixture of the conducting polymer and the inorganic active material is also a powder-like mixture, the formed composite electrode is not thoroughly uniform in quality in its entirety. Therefore, it is extremely difficult to obtain a sheet-shaped composite electrode with sufficiently high strength, density and flexibility for use in practice. Furthermore, since a large amount of a binder agent must be added to the mixture of the conducting polymer and the inorganic active material, a composite electrode with a desired energy density cannot be obtained.

In the method (2), the amount of the inorganic active material that can be incorporated into the polymer is limited, so that a sufficiently high volume energy density for use in practice cannot be obtained.

Thus, it is extremely difficult to fabricate a positive electrode with high energy density for a secondary battery by the conventional methods.

Another problem encountered in the course of the development of a lithium secondary battery is the development of a negative electrode. Conventionally, as a material for the negative electrode of a lithium secondary battery, lithium and lithium-aluminum alloys are used. However, lithium has poor charging and discharging cycle characteristics, and has the risk that short-circuits take place because of the formation of a dendrite; and lithium-aluminum alloys have the shortcomings that it is difficult to fabricate a high voltage battery by using any of lithium-aluminum alloys because the potential of any of the lithium-aluminum alloys tends to shift to a higher potential, although the cycle characteristics are fairly good. Lithium-aluminum alloys also have the shortcoming that they lack in flexibility.

Under such circumstances, lithium secondary batteries using carbon materials capable of performing the intercalation and deintercalation of lithium ions in a negative electrode thereof have been actively developed and recently attracted attention. However, the performance of such lithium secondary batteries is not satisfactory for use in practice.

SUMMARY OF THE INVENTION

It is therefore a first object of the present invention to provide a positive electrode for use in a secondary battery, which has excellent workability, strength and cycle characteristics, high energy density with an appropriate potential plateau, and is capable of providing a large electrode area.

A second object of the present invention is to provide a secondary battery using the above-mentioned positive electrode.

The first object of the present invention is achieved by a positive electrode comprising a film-shaped composite active material, which comprises a conducting polymer serving as a first active material, and an electrochemical active material serving as a second active material which is uniformly dispersed in the shape of particles in the conducting polymer, with the parts-by-weight ratio of the second active material to the first active material being 3 to 9 parts of the second active material to 7 to 1 part of the first active material when the total of the first active material and the second active material is 10 parts.

The second object of the present invention is achieved by using he above-mentioned positive electrode in a secondary battery.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a schematic cross-sectional illustration of a conventional positive electrode composed of an inorganic active material including an electroconductive auxiliary agent, and a binder agent; and FIG. 2 is a schematic cross-sectional illustration of a positive electrode active material comprising a conducting polymer serving as a first active material, and an electrochemical, inorganic active material serving as a second active material.

DESCRIPTION OF THE PREFERRED EMBODIMENTS

The positive electrode according to the present invention comprises a film-shaped composite active material, which comprises a conducting polymer (hereinafter referred to as the first active material), and an electrochemical active material (hereinafter referred to as the second active material) which is uniformly dispersed in the shape of particles in the first active material, with the parts-by-weight ratio of the second active material to the first active material being 3 to 9 parts of the second active material to 7 to 1 part of the first active material when the total of the first active material and the second active material is 10 parts.

In the first active material and the second active material of the positive electrode according to the present invention, charging and discharging are conducted in completely different mechanisms.

Specifically, in the second active material, discharging is carried out by the intercalation of a cation, while in the first active material, discharging is carried out by the undoping of an anion. Charging is reversely carried out in the second active material and in the first active material, respectively. More specifically, in the second active material, charging is carried out by the deintercalation of the cation, while in the first active material, charging is carried out by the doping of the anion.

In the above, it is necessary that the anion and cation sufficiently diffuse within the respective active materials.

In the positive electrode according to the present invention, when the amount of the second active material is more than 90 wt. % of the total amount of the first active material and the second active material, the binding force and ion conductivity of the film-shaped composite active material become insufficient, while when the amount is less than 30 wt. %, the energy density thereof becomes insufficient, so that it becomes impossible to have the second active material exhibit its maximum performance. When the mechanical strength of the positive electrode taken into consideration, the amount of the second active material is preferably in the range of 30 to 90 wt. %, more preferably in the range of 60 to 80 wt. %, of the total weight of the first active material and the second active material.

The first active material for use in the present invention is such a material that is capable of working as active material, insoluble in an electrolytic solution, adhesive to polymeric materials, and exhibits electroconductivity. As illustrated in FIG. 2, the first active material 1 also works as a binder agent for the second active material 2 to fix the second active material and covers the second active material 2 in its entirety. As a result, the surroundings around the second active material 2 become electroconductive.

Examples of polymers serving as the first active material are redox active, electroconductive polymeric materials such as polyacetylene, polypyrrole, polythiophene, polyaniline, polydiphenylbenzidine, polyvinylcarbazole, and polytriphenylamine. Among these polymers, the nitrogen-containing polymers exhibit remarkable effects is the first active material.

It is required that these polymers exhibit high electroconductivities by electrochemical doping, and when they are used in an electrode, it is required that they have an electroconductivity of $10^{-2}$ S/cm or more. Furthermore, these polymers are required to have high ion conductivity in ionic diffusion. These conducting polymers are capable of working as active materials, but also as collectors because of the high electroconductivity thereof, and also as binder agents.

Of the above-mentioned conducting polymers, polypyrrole, polyaniline compounds and copolymers thereof are preferable for use in the present invention because they have a relatively large energy density per unit weight, and charging and discharging can be carried out in a relatively stable manner in non-aqueous electrolyte liquids in general use.

Conducting polymers are generally insulating in an undoped state, but the above-mentioned conducting polymers are always in an electroconductive state because they have a small affinity for electrons, and because even when placed in an undoped state in an electrolytic solution, without being charged, they become electroconductive by the occurrence of slight doping.

As an electrochemical active material serving as the second active material for use in the present invention, any materials that have an excellent voltage plateau can be preferably employed. Examples of such materials are oxides of transition metals such as V, Co, Mn, and Ni; and composite oxides of any of the above-mentioned transition metals and alkali metals.

When the electrode potential for maintaining an electrolytic solution stable, the voltage plateau, and the energy density are taken into consideration, crystalline vanadium oxides are preferably employed, and crystalline vanadium pentoxide is more preferably employed. This is because a potential plateau of a discharge curve of crystalline vanadium pentoxide is located relatively near the potential of the electrode set by the doping or undoping of an anon of the above-mentioned conducting polymers.

It is preferable that a maximum particle size of the electrochemical material used as the second active material be 10 $\mu$m or less, more preferably 3 $\mu$m or less, and an average particle size thereof be 3 $\mu$m or less, more preferably 1 $\mu$m or less, to prevent the decrease of the voltage at the electrode, and to appropriately maintain the potential plateau thereof. Furthermore, it is preferable that the particles of the electrochemical material be microscopically and macroscopically uniformly distributed throughout the first active material to attain high workability, strength and flexibility. In the present invention, such a state is referred to as "uniform in quality".

The first active material and the second active material can be composed preferably by any of the following methods: (1) a method of sufficiently mixing the first active material and the second active material; (2) a method of sufficiently mixing the first active material and the second active material in a solvent in which the first active material can be completely or partly dissolved; and (3) a method of chemically or electrochemically producing the first active material in the presence of the second active material.

In order to prepare a uniform composite material of the first active material and the second active material, it is more preferable to compose the first active material and the second active material by a mechanochemical technique using a hybridizer in the above-mentioned method (1). For obtaining a composite electrode with higher density and uniformity, the above-mentioned method (2) is most preferable. The above-mentioned methods (1) and (2) can be used in combination.

It is preferable that a positive electrode fabricated by the composition of the first active material and the second active material have a density of 1.0 to 3.5 g/cm$^3$, more preferably a density of 1.6 to 3.5 g/cm$^3$. When the density of the positive electrode is less than 1.0 g/cm$^3$, voids tend to be formed in the electrode because of insufficient composition of the first active material and the second active material.

An electrode with such voids, when used in a battery, decrease the energy density of the battery, and because of such voids, the binding force between the first active material and the second active material is reduced, and accordingly the mechanical strength of the electrode is decreased. Furthermore, the electroconductivity of the electrode itself is also decreased. The result is that it is difficult to carry out fast charging and heavy load discharging by such a battery.

On the other hand, when the density of the positive electrode exceeds 3.5 g/cm$^3$, the volume energy density thereof is theoretically increased, but there is substantially no space for holding electrolyte components within the electrode. Therefore, the rate of supplying ions, which occurs at charging and discharging in a battery, is so reduced that fast charging and heavy load discharging becomes impossible. As a result, the energy that can be obtained is decreased, and the energy density of the battery is substantially decreased.

The positive electrode according to the present invention can be fabricated, for instance, by preparing a uniform dispersion of the first active material, the second material and a solvent, and continuously applying the uniform dispersion onto an electron collector (hereinafter simply referred to as the collector), thereby forming an electrode film, in which the second active material with a predetermined average particle size and a pre-determined maximum particle size is uniformly dispersed in the first active material.

According to the present invention, the thus fabricated electrode film can perform charging and discharging with high energy density and high charging and discharging ratio.

As the above-mentioned first active material for use in the above-mentioned method using a solvent, solvent-soluble conducting polymers, for example, polyalkylthiophenes with 4 or more carbon atoms, such as polyhexylthiophene, and polydodecylthiophene; polyalkoxythiophene; polyalkoxypyrrole; and polyaniline compounds, such as poly-2,5-alkoxyaniline and poly-N-alkylaniline, each with 6 or more carbon atoms are preferably employed.

Of these conducting polymers, polyaniline is most preferable because the energy density per unit weight is relatively large, and charging and discharging can be performed in a relatively stable manner.

The above-mentioned conducting polymers are used by dissolving them in an organic solvent such as dimethylformamide, N-methylpyrrolidone, or tetrahydrofuran, pyrrolidine, toluene, xylene, chloroform, or dichloroethane. When the above-mentioned polyaniline compounds are used as the first active material, dimethylformamide, N-methylpyrrolidone, tetrahydrofuran, and pyrrolidine are suitable for the solvent therefor. Furthermore, it is preferable that the polyaniline compounds be in a completely reduced state when dissolved in the above-mentioned solvent.

It is preferable that the second active material have a density of 2.5 g/cm$^3$ or more in order to increase the volume energy density thereof. For this purpose, for example, vanadium pentoxide is preferable for use as the second active material, since vanadium pentoxide satisfies the above-mentioned conditions, and a discharge curve thereof has a plateau near a potential at which an electrochemical redox reaction is caused to take place in the above-mentioned conducting polymers.

In order to maintain the close contact of the second active material with the first active material, thereby increasing the energy density thereof, and to increase the uniformity in quality of a coating liquid for the fabrication of the positive electrode, it is preferable that the average particle size of the second active material be 3 $\mu$m or less, more preferably 1 $\mu$m or less, and the maximum particle of the second active material be 10 $\mu$m or less, more preferably 3 $\mu$m or less.

As mentioned above, a positive electrode according to the present invention can be prepared from a uniform, high concentrated coating liquid in which the first active material, the second active material and any of the above-mentioned solvents are dispersed.

It is preferable that the above coating liquid contain 20 wt. % or more of solid components with respect to the solvent. As mentioned previously, the weight ratio of the first active material: the second active material is in the range of (7 to 1):(3 to 9), preferably in the range of (4 to 1):(6 to 9), respectively, when the total of the first active material and the second active material is 10.

In the preparation of the coating liquid, the solid components can be dispersed in a solvent in a ball mill or in other conventional mills.

When polyaniline compounds are used as the first active material, it is preferable that the concentration of the polyaniline compounds in the solvent be in the range of 5 wt. % to 25 wt. %, and the concentration thereof in the coating liquid be 5 to 20 wt. %. When the concentration of the polyaniline compounds is in the above range, the viscosity of the coating liquid is in the range of 400 cP to 10,000 cP, preferably in the range of 1,000 cP to 10,000 cP, in which range the second active material does not precipitate, and the coating liquid can be maintained uniform in quality.

Furthermore, it is preferable that the coating liquid be prepared under an inert atmosphere in order to prevent the conducting polymers from being changed in quality.

The thus obtained uniform coating liquid is molded into a film, or coated on a substrate, preferably on a collector substrate by the wire bar coating method, the blade coating method, the spray coating method, or other conventional coating methods, and dried, whereby a positive electrode film for a secondary battery, comprising the first active material and the second active material which is uniformly dispersed in the first active material, can be fabricated.

By controlling the viscosity of the coating liquid that is, the concentration of the solid components in the coating liquid, so as to be in the previously mentioned range, a positive electrode film with a thickness of 10 to 500 $\mu$m can be fabricated. It is preferable that the thickness of the positive electrode film be in the range of 20 to 300 $\mu$m.

Further, it is preferable that the positive electrode film comprising the above-mentioned first active material and the second active material have a density in the range of 1.0 to 3.5 g/cm$^3$.

The higher the density, the better within the above-mentioned range for the positive electrode film. In particular, when any of the previously mentioned polyaniline compounds is used as the first active material, and vanadium pentoxide as the second active material, with the polyaniline compound being dissolved in a solvent, a positive electrode film with a density of 1.8 g/cm$^3$ can be fabricated without difficulty.

When necessary, an electroconductive auxiliary agent for imparting electroconductivity can be added to the components for the above-mentioned positive electrode film. Examples of such an electroconductive auxiliary agent are electroconductive carbon powders, such as acetylene black, aniline black, active carbon, and graphite powders; carbon materials made from PAN (polyacrylonitrile), pitch, cellulose, or phenol; carbon fiber; metal oxide powders such as powders of Ti, Sn, and In oxides; metal powders and fibers, such as powders or fibers of stainless steel and nickel.

It is preferable that the electroconductive auxiliary agent for use in the present invention have high electroconductivity and high electroconductivity-imparting performance even when used in a small amount.

As the substrate for the positive electrode film, there can be used a metal film made of a metal such as nickel, titanium, copper, aluminum, tin, or stainless steel; and the above-mentioned metal film provided with a collector made of a conducting polymer film such as a polypyrrole film.

As the materials for the above substrate, aluminum and stainless steel are preferable for use in the present invention. When the above-mentioned metal film is used as the substrate, it is preferable that the surface of the metal film be made rough.

As mentioned previously, it is preferable that the coating liquid for the fabrication of the positive electrode film according to the present invention be prepared under an inert atmosphere.

More specifically, for instance, when polyaniline is used as the first active material, it is preferable that polyaniline be dissolved in a solvent, and an electrochemical active material in the form of particles serving as the second active material be dispersed in the above prepared polyaniline solution in an atmosphere of an inert gas.

Examples of the inert gas for use in the above-mentioned inert atmosphere are argon, helium, xenon, and nitrogen.

The polyaniline solution prepared in the above can be preserved without gelatin or formation of a material in the shape of particles under the above-mentioned inert atmosphere.

If oxygen and water are present in the above-mentioned inert atmosphere, they have adverse effects on the coating liquid. Therefore it is preferable that the concentration of oxygen in the inert gas be 100 ppm or less, more preferably 10 ppm or less; and that the concentration of water be such that the dew point of the water is −50° C. or below, preferably −70° C. or below.

The positive electrode comprising the above-mentioned first active material and the second active material according to the present invention has excellent workability and flexability, so that it is suitable for the fabrication of a sheet-shaped electrode and also electrode for the fabrication of a paper-shaped battery.

A secondary battery according to the present invention will now be explained. This secondary battery used the above-mentioned positive electrode of the present invention.

As a negative electrode active material for the secondary battery of the present invention, there can be employed alkali metals such as Li and Na; alkali metal alloys such as Li-Al; conducting polymers such as polyacethylene, polythiophene, poly-p-phenylene, and polypyridine; and intercalation materials capable of inserting an alkali metal such as lithium.

Of the above materials, the intercalation materials are preferable for use in the secondary battery of the present invention because they are safe, free from the formation of dendrites, and have an extended cycle life.

Examples of the intercalation materials for use as the negative electrode active material are ceramics materials such as $BC_2N$; and carbon materials. In view of the life cycle and energy density, carbon materials are more suitable for use as the negative electrode active material than ceramic materials.

When a carbon material is used as the negative electrode active material, the potential of the negative electrode changes in accordance with the amount of discharge. Therefore, it is extremely important that the amount of a positive electrode active material and the amount of a negative electrode active material is well-balanced.

In the case of a conventional ion battery, a negative-electrode discharging type battery system is incorporated. In contrast to this, in the present invention, a positive-electrode discharging type battery system is preferable. In the present invention, it is preferable that the positive electrode active material and the negative electrode active material be incorporated in the battery in such a manner that the energy capacity of the negative electrode active material in a voltage range of 0 to 0.8 V is two or more times the energy capacity of the positive electrode active material, since the cycle characteristics of the battery can be significantly improved in such incorporation of the negative electrode active material and the positive electrode active material. As the above-mentioned carbon materials for use in the present invention, sintered materials of synthetic polymers and natural polymers are employed.

Examples of the synthetic polymers are phenol resin, polyacrylonitrile resin, furan resin, polyamide resin, and polyimide resin, and examples of the natural polymers are animal-derived and plant-derived polymers such as natural polymers, petroleum-based pitches and cokes, and coal-based pitches and cokes.

The carbon materials obtained from the above polymers when sintered, change their crystalline structures thereof, depending upon the sintering temperature. As the sintering temperature is increased, the crystalline structures thereof become like graphite structure.

High-temperature sintered materials with an interplanar spacing d002 of 3.4 Å or less, and natural graphite are excellent for obtaining a voltage plateau in the battery.

Carbon materials with an interplanar spacing d002 of 3.45 Å to 3.7 Å have a turbostratic structure and a low electroconductivity, so that they must be used in combination with an electroconductive auxiliary agent such as metals, metallic oxides or graphite, but are excellent in the cycle life.

Of negative electrodes comprising the above-mentioned carbon materials, a negative electrode comprising graphite and a carbon material with a turbostratic structure is most preferable for use in the battery of the present invention because it has high energy density, high cycle life, and excellent voltage plateau with a low impedance.

As the graphite used in the negative electrode comprising graphite and a carbon material with a turbostratic structure, a graphite with an interplanar spacing d002 of 3.354 to 3.4 Å, preferably 3.354 to 3.36 Å, is employed in view of the electroconductivity of the negative electrode. When the interplanar spacing of the graphite is in the above range, the electroconductivity of the negative electrode is advantageously high.

As the carbon material with a turbostratic structure, a carbon material with an interplanar spacing d002 of 3.45 to 3.7 Å, preferably 3.5 to 3.7 Å, has an excellent cycle life and a large discharge capacity.

The ratio of the graphite:the carbon material with a turbostratic structure in the negative electrode for use in the present invention is in the range of (3:95) to (50:50), preferably in the range of (5:95) to (40:60), since a satisfactory electroconductivity and a sufficiently long cycle life can be obtained with respect to the negative electrode.

A carbon-based negative electrode for use in the present invention can be fabricated by adding a binder agent such as teflon, polyvinylidene fluoride, polyacrylonitrile, or polyethylene oxide to any of the above-mentioned carbon materials to prepare a mixture of the binder agent and the carbon material, and applying the mixture to a foil, a punching metal, and expand metal, or a wire net of a metal such as Cu, Ti, or Ni.

Examples of a solvent for an electrolytic solution for use in the battery according to the present invention are carbonates such as propylene carbonate, ethylene carbonate, and butylene carbonate; ethers such as tetrahydrofuran, 2-methyltetrahydrofuran, 1,2-dimethoxyethane, ethoxymethoxyethane, methyl diglyme, and methyl triglyme; 1,3-dioxolan, 4-methyldioxolan, γ-butyl lactone, sulfolane; and 3-methylsulfolane. These solvents can be used alone or in combination.

Mixed solvents composed of a carbonate as the main component, an ether, and a lactone exhibit particularly excellent high energy capacities.

The inventors of the present invention have discovered that mixed solvents comprising ethylene carbonate as the main component exhibit excellent characteristics as the solvents for electrolytic solution for use in the battery of the present invention.

Electrolytic salts for use in the present invention comprise halogen-containing anions and cations. Examples of such electrolytic salts are as follows:

(1) Anions

Halogenated anions of elements belonging to Va group, such as $PF_6^-$, $SbF_6^-$, and $SbCl_6^-$; halogenated anions of elements belonging to IIIa group, such as $BF_4^-$; and perchlorate anions such as $ClO_4^-$.

(2) Cations

Alkali metal ions such as $Li(-)$, $Na(-)$, or $K(-)$; and $(R^4N)(-)$, wherein R is a hydrocarbon group having 1 to 20 carbon atoms.

Specific examples of compounds which provide the above-mentioned electrolytic ions are $LiPF_6$, $LiSbF_6$, $LiAsF_6$, $LiClO_4$, $NaClO_6$, $KI$, $KPF_6$, $KSbF_6$, $KAsF_6$, $KClO_6$, $[(n-Bu)_4N](-)AsF_6^-$, $[(n-Bu)_4N](-).ClO_4^-$, $LiAlCl_4$, $LiBF_6$, $LiCF_3SO_3$, and $LiN(CF_3SO_2)_2$.

The inventors have discovered that of the above-mentioned compounds, a system comprising $LiCF_3SO_3$, or $LiN(CF_3SO_2)_2$ provides excellent cycle characteristics and a large energy capacity.

As a separator for use in the battery is used, a material which has a low resistance to the ion transfer of an electrolytic solution, and is excellent in a liquid retention property. Examples of such a material are a glass fiber filter; pore filters made of a polymer such as polyester, Teflon, Polyflon, polypropylene, or polyethylene; nonwoven fabric, and non-woven fabrics composed of glass fiber and any of the above-mentioned polymers.

Instead of the above-mentioned electrolytic solution, inorganic and organic solid electrolytes can be employed.

Examples of an inorganic solid electrolyte are halogenated metals such as AgCl, AgBr, AgI, and LiI; and ion-conduction glass such as $RbAg_4I_5$, and $RbAg_4I_4CN$.

Examples of an organic solid electrolyte are (1) solid solutions of (a) a matrix polymer having ion-dissociation groups such as an oxyethylene chain, an oxypropylene chain, and an ethylene imine chain, at the main chain or side chains of the polymer, and (b) an electrolytic salt; (2) a solid electrolyte comprising (c) a cross-linked matrix polymer having ion-dissociation groups such as an oxyethylene chain, an oxypropylene chain, and an ethylene imine chain, at the main chain or side chains of the polymer, and (d) an electrolytic salt; (3) a gel electrolyte comprising (e) a polymer matrix such as polyethylene oxide, polypropylene oxide, polyvinylidene fluoride, or polyacrylonitrile, (f) a solvent, and (g) an electrolytic salt; and (4) a viscoelastic, polymeric solid electrolyte with a structure in which any of the previously mentioned electrolyte solutions is contained in any of the above-mentioned polymers.

As the organic solid electrolyte for use in the present invention, the above-mentioned gel electrolyte and the viscoelastic, polymeric solid electrolyte are preferable because these solid electrolytes easily penetrate into the positive electrode of the present invention.

The above-mentioned viscoelastic, polymeric solid electrolyte for use in the battery of the present invention can be prepared by dissolving a polymerizable compound in a non-aqueous electrolyte liquid and polymerizing the polymerizable compound.

The polymerizable compound mentioned above means such a compound that exhibits thermal polymerizability, or polymerizability upon being exposed to an active light such as ultraviolet light, electron rays, gamma-ray, or X-ray.

The kind of such a polymerizable compound for use in the present invention cannot be limited to a particular kind, but compounds which exhibit photo polymerizability when exposed to active rays are preferably employed.

As an example of the photo polymerization by such an active light, polymerization reactions of unsaturated carboxylic acid esters, polyene/polythiol mixtures, and cross-linking macromers (such as organic silane, and poly-iso-thianaphthene) can be given. Preferable examples of such photo polymerization are reactions of unsaturated carboxylic acid esters, and polyene/polythiol mixtures.

Specific examples of unsaturated carboxylic acids for the photo polymerization are as follows:

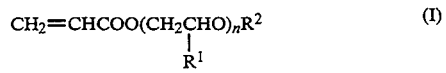
(I)

wherein $R^1$ is a hydrogen atom or methyl group; $R^2$ is a hydrocarbon group which may contain a heterocyclic ring; and n is an integer of 1 or more.

(II)

wherein $R^3$ is a hydrogen atom, or methyl group, and $R^4$ is a group containing a heterocyclic ring.

Examples of a thermal polymerization reaction for preparing the viscoelastic, polymeric solid electrolytes are a reaction of forming urethane, and a polymerization reaction of epoxy group and acrylate group. Of these thermal polymerization reactions, the former urethane-forming reaction is preferable.

The positive electrode according to the present invention is a sheet-shaped electrode with high energy density and high mechanical strength, so that it is possible to perform a variety of mountings in a battery, such as in a wound form or in a laminated form.

The secondary battery for use in the present invention may be cylinder-shaped, coin-shaped, rectangular-flat or flat as desired.

It is extremely difficult to fabricate a flat secondary battery, in particular, a thin secondary battery with an electrode area of 20 cm$^2$ or more by conventional methods because of various problems such as the generation of gases from the battery while in use.

In contrast to this, according to the present invention, it is easy to fabricate a secondary battery with an electrode area of more than 20 cm$^2$.

Of the above secondary batteries, a flat secondary battery can be fabricated as a flexible, spaceless battery. When the flat secondary battery is fabricated in the form of a single-layered battery, it is possible to make the thickness thereof 0.5 mm or less, and to make the energy density 30 mAh/cm$^3$, and when the flat secondary battery is fabricated in the form of a multi-layered battery, it is possible to attain an energy density of 50 mAh/cm$^3$ or more.

The features of this invention will become apparent in the course of the following description of exemplary embodiments which are given for illustration of the invention and are not intended to be limiting thereof.

Example 1

20 mg of a finely-divided crystalline vanadium pentoxide with an averaging particle size of 0.6 μm and a maximum particle size of 2 μm, and 10 mg of polyaniline synthesized by chemical polymerization were mixed under an inert atmosphere, whereby a positive electrode active material was prepared.

The thus prepared positive electrode active material was formed into a sheet with a thickness of 400 μm by rollers, whereby a positive electrode No. 1 according to the present invention was prepared.

By using the above prepared positive electrode, a lithium plate serving as a negative electrode, and an electrolytic solution prepared by dissolving 3 moles of LiClO$_4$ in a 1 liter of a mixed solvent of propylene carbonate and dimethoxy ethane (hereinafter referred to as DME) in the respective weight ratio of 7:3, a secondary battery No. 1 according to the present invention was fabricated.

The thus fabricated secondary battery was subjected to the following charging and discharging tests by using a commercially available charging and discharging test apparatus (Trademark "HJ-201B" made by Hokutodenko Co., Ltd.).

The secondary battery was charged with a current of 0.4 mA/cm$^2$ of the positive electrode until the voltage of the battery reached 3.7 V. The battery was then allowed to stand for 10 minutes, without charging or discharging. The battery was then allowed to be discharged with a current of 0.4 mA/cm$^2$ of the positive electrode until the voltage of the battery was reduced to 2.5 V.

This charging and discharging was repeated, and the energy density of the positive electrode in terms of mWh/g and mWh/cm$^3$, and the discharge capacity of the same in terms of mAh/g and mAh/cm$^3$ at the fifth cycle of the charging and discharging were measured. The results are shown in TABLE 1.

Furthermore, the cycle life of this battery was also investigated by counting the number of the above charging and discharging cycles until the discharge capacity (mAh/g) of the battery was reduced to a half of the initial discharge capacity of the battery. The result was that the cycle life was more than 300 times of the repetition of the charging and discharging as shown in TABLE 1.

Example 2

10 mg of a finely-divided crystalline vanadium pentoxide with an average particle size of 0.6 μm and a maximum particle size of 2 μm, and 20 mg of polyaniline synthesized by chemical polymerization were mixed under an inert atmosphere, whereby a positive electrode active material was prepared.

The thus prepared active material was formed into a sheet with a thickness of 400 μm by rollers, whereby a positive electrode No. 2 according to the present invention was prepared.

The procedure for fabricating the secondary battery No. 1 according to the present invention in Example 1 was repeated except that the positive electrode No. 1 employed in Example 1 was replaced by the above prepared positive electrode No. 2, whereby a secondary battery No. 2 according to the present invention was fabricated in the same manner as in Example 1.

The thus fabricated secondary battery was subjected to the same charging and discharging tests under the same conditions as in Example 1. The results are shown in TABLE 1.

Example 3

20 mg of a finely-divided β-Li$_x$V$_2$O$_5$ (x=0.3) with an average particle size of 0.6 μm and a maximum particle size of 2 μm, and 10 mg of polyaniline synthesized by chemical polymerization were mixed under an inert atmosphere to prepare a positive electrode active material.

This positive electrode active material was formed into a sheet with a thickness of 400 μm by rollers, whereby a positive electrode No. 3 according to the present invention was prepared.

The procedure for fabricating the secondary battery No. 1 according to the present invention in Example 1 was repeated except that the positive electrode No. 1 employed in Example 1 was replaced by the above prepared positive electrode No. 3, whereby a secondary battery No. 3 according to the present invention was fabricated in the same manner as in Example 1.

The thus fabricated secondary battery was subjected to the same charging and discharging tests under the same conditions as in Example 1. The results are shown in TABLE 1.

Example 4

20 mg of a finely-divided crystalline vanadium pentoxide with an average particle size of 0.6 μm and a maximum particle size of 2 μm, and 10 mg of polypyrrole were mixed under an inert atmosphere, so that a positive electrode active material was prepared.

The thus prepared positive electrode active material was formed into a sheet with a thickness of 400 μm by rollers, whereby a positive electrode No. 4 according to the present invention was prepared.

The procedure for fabricating the secondary battery No. 1 according to the present invention in Example 1 was repeated except that the positive electrode No. 1 employed in Example 1 was replaced by the above prepared positive electrode No. 4, whereby a secondary battery No. 4 according to the present invention was fabricated in the same manner as in Example 1.

The thus fabricated secondary battery was subjected to the same charging and discharging tests under the same conditions as in Example 1. The results are shown in TABLE 1.

Comparative Example 1

The procedure for Example 1 was repeated except that the positive electrode employed in Example 1 was replaced by a comparative positive electrode which was made from only 30 mg of polyaniline synthesized by chemical polymerization, whereby a comparative secondary battery No. 1 was fabricated.

The thus fabricated comparative secondary battery was subjected to the same charging and discharging tests under the same conditions as in Example 1. The results are shown in TABLE 1.

TABLE 1

|  |  | Ex. 1 | Ex. 2 | Ex. 3 | Ex. 4 | Comp. Ex. 1 |
|---|---|---|---|---|---|---|
| Energy | (mWh/g) | 462.1 | 402.4 | 497.6 | 341.0 | 334.8 |
| Density | (mWh/cm$^3$) | 307.9 | 178.2 | 331.0 | 327.4 | 150.9 |
| Discharge | (mAh/g) | 140.2 | 122.6 | 150.8 | 110.1 | 108.6 |
| Capacity | (mAh/cm$^3$) | 93.3 | 54.5 | 100.2 | 105.6 | 48.7 |
| Cycle Life | (times) | 300< | 300< | 300< | 300< | 300< |

* "300<" in the above denotes more than 300 times.

Comparative Example 2

A finely-divided crystalline vanadium pentoxide with an average particle size of 0.6 μm and a maximum particle size of 2 μm, graphite, and finely-divided teflon particles were mixed in the respective ratio of 7:1:1 in terms of parts by weight under an inert atmosphere, whereby a comparative positive electrode active material was prepared.

This comparative positive electrode active material was formed into a sheet with a thickness of 400 μm by rollers, whereby a comparative positive electrode No. 2 was prepared.

The procedure for fabricating the secondary battery No. 1 according to the present invention in Example 1 was repeated except that the positive electrode No. 1 employed in Example 1 was replaced by the above prepared comparative positive electrode No. 2, whereby a comparative secondary battery No. 2 was fabricated in the same manner as in Example 1.

The thus fabricated comparative secondary battery was subjected to charging and discharging tests by using the same charging and discharging test apparatus as employed in Example 1 under the following conditions:

The secondary battery was charged with a current of 0.4 mA/cm$^2$ of the positive electrode until the voltage of the battery reached 3.7 V. The battery was then allowed to stand for 10 minutes, without charging or discharging. The battery was then allowed to be discharged with a current of 0.4 mA/cm$^2$ of the positive electrode until the voltage of the battery was reduced to 2.5 V.

The above charging and discharging was repeated, and the energy density of the battery in terms of mWh/g and mWh/cm$^3$, and the discharge capacity thereof in terms of mAh/g and mAh/cm$^3$ at the fifth cycle of the charging and discharging were measured.

The above charging and discharging test was repeated in the same manner as mentioned above except that the current for charging and discharging was changed from 0.4 mA/cm$^2$ of the positive electrode to 2 mA/cm$^2$ of the positive electrode. The results are in the following TABLE 2:

TABLE 2

| Current | mAh/g | mAh/cm$^3$ | mWh/g | mWh/cm$^3$ |
|---|---|---|---|---|
| 0.4 mA/cm$^2$ | 135.2 | 190.5 | 445.1 | 628.9 |
| 2.0 mA/cm$^2$ | 74.6 | 105.2 | 230.5 | 324.1 |

The above results indicate that the charging and discharging characteristics of this comparative secondary battery are poor in a heavy load state.

Example 5

20 mg of a finely-divided crystalline vanadium pentoxide with an average particle size of 0.6 μm and a maximum particle size of 2 μm, and 10 mg of polyaniline synthesized by chemical polymerization were mixed under an inert atmosphere, whereby a positive electrode active material was prepared.

The thus prepared positive electrode active material was formed into a sheet with a thickness of 400 μm by rollers. The thus formed sheet was then subjected to a press molding by a press molding machine, whereby a positive electrode No. 5 according to the present invention was prepared.

By using the above prepared positive electrode, a lithium plate serving as a negative electrode, and an electrolytic solution prepared by dissolving 3 moles of LiBf$_4$ in a 1 liter of a mixed solvent of propylene carbonate and DME in the respective weight ratio of 7:3, whereby a secondary battery No. 5 according to the present invention was fabricated.

The thus fabricated secondary battery was subjected to the same charging and discharging tests by using the same commercially available charging and discharging test apparatus under the same test conditions as in Example 1.

The results are shown in TABLE 3.

Example 6

15 mg of a finely-divided crystalline vanadium pentoxide with an average particle size of 0.6 μm and a maximum particle size of 2 μm, and 15 mg of polyaniline synthesized by chemical polymerization were mixed under an inert atmosphere, so that a positive electrode active material was prepared.

A positive electrode No. 6 according to the present invention was prepared from the above prepared positive electrode active material in the same manner as in Example 5.

The procedure for fabricating the secondary battery No. 5 according to the present invention in Example 5 was repeated except that the positive electrode No. 5 employed in Example 5 was replaced by the above prepared positive electrode No. 6, whereby a secondary battery No. 6 according to the present invention was fabricated.

The thus fabricated secondary battery was subjected to the same charging and discharging tests under the same conditions as in Example 1. The results are shown in TABLE 3.

Example 7

20 mg of a finely-divided β-Li$_x$V$_2$O$_5$ (x=0.3) with an average particle size of 0.6 μm and a maximum particle size of 2 μm, and 10 mg of polyaniline synthesized by chemical polymerization were mixed under an inert atmosphere to prepare a positive electrode active material.

A positive electrode No. 7 according to the present invention was prepared from the above prepared positive electrode active material in the same manner as in Example 5.

The procedure for fabricating the secondary battery No. 5 according to the present invention in Example 5 was repeated except that the positive electrode No. 5 employed in Example 5 was replaced by the above prepared positive electrode No. 7, whereby a secondary battery No. 6 according to the present invention was fabricated.

The thus fabricated secondary battery was subjected to the same charging and discharging tests under the same conditions as in Example 1. The results are shown in TABLE 3.

Example 8

20 mg of a finely-divided crystalline vanadium pentoxide with an average particle size of 0.6 μm and a maximum particle size of 2 μm, and 10 mg of polypyrrole were mixed under an inert atmosphere, so that a positive electrode active material was prepared.

A positive electrode No. 8 according to the present invention was prepared from the above prepared positive electrode active material in the same manner as in Example 5.

The procedure for fabricating the secondary battery No. 5 according to the present invention in Example 5 was repeated except that the positive electrode No. 5 employed in Example 5 was replaced by the above prepared positive electrode No. 8, whereby a secondary battery No. 6 according to the present invention was fabricated.

By using the above prepared positive electrode, a secondary battery No. 8 according to the present invention was fabricated in the same manner as in Example 5.

The thus fabricated secondary battery was subjected to the same charging and discharging test as in Example a 1. The results are shown in TABLE 3.

Example 9

9 parts by weight of a carbon material capable of electrochemically performing intercalation and deintercalation of a lithium ion, and 1 part by weight of finely-divided teflon particles were mixed and kneaded.

The kneaded mixture was then applied to a stainless steel screen with the application of pressure thereto, and press-molded, whereby a 4×7 cm sheet-shaped negative electrode provided with a 700 μm thick negative active material layer was prepared.

A 4×7 cm positive electrode was prepared in the same manner as in Example 1.

An electrolytic solution was prepared by mixing the following components:

|  | Parts by Weight |
| --- | --- |
| LiBF$_4$ | 20 |
| Propylene carbonate | 48 |
| Dimethoxy ethane (DME), | 19 |
| Ethoxyethylone glycol acrylate | 12.8 |
| Trimethylol propane triacrylate | 0.2 |
| Benzoin-iso-propyl other | 0.1 |

The above prepared negative electrode, positive electrode, and a porous polypropylene separator were impregnated with the above prepared electrolytic solution, and were then exposed to the light of a high-pressure mercury lamp, whereby each of the electrodes and the separator was compounded with a polymer solid electrolyte.

These composite members were laminated and sealed under reduced pressure by use of a thermofusible polypropylene frame, whereby a secondary battery No. 9 according to the present invention was fabricated, which was a thin and flat battery with a size of 90 mm×60 mm.

The thus fabricated secondary battery was subjected to a charging and discharging test by using the same commercially available charging and discharging test apparatus as employed in Example 1 under the following conditions:

The secondary battery was charged with a current of 0.4 mA/cm$^2$ of the positive electrode until the voltage of the battery reached 3.7 V. The battery was then allowed to stand for 10 minutes, without charging or discharging. The battery was then allowed to be discharged with a current of 0.4 mA/cm$^2$ of the positive electrode until the voltage of the battery was reduced to 2.0 V.

The results are shown in TABLE 3.

Example 10

A carbon material composed of (a) 9 parts by weight of a carbon fiber with a turbostratic structure with an interplanar space d002 of 3.45 Å and a particle size Lc of 15 Å, and (b) 1 part by weight of a graphite with an interplanar space d002 of 3.35 Å and a particle size Lc of 100 Å or more was prepared.

9 parts by weight of the above carbon material and 1 part by weight of finely-divided teflon particles were mixed and kneaded. The kneaded mixture was then applied to a stainless steel screen with the application of pressure thereto, and press-molded, whereby a 4×7 cm sheet-shaped negative electrode provided with a 700 μm thick negative active material layer was prepared.

A 4×7 cm positive electrode was prepared in the same manner as in Example 1.

The above prepared negative electrode, positive electrode, and a porous polypropylene separator were impregnated with the same electrolytic solution as prepared in Example 9, and were then exposed to the light of a high-pressure mercury lamp, whereby each of the electrodes and the separator was compounded with a polymer solid electrolyte.

These composite members were laminated and sealed under reduced pressure by use of a thermofusible polypropylene frame, whereby a secondary battery No. 10 according to the present invention was fabricated, which was a thin and flat secondary with a size of 90 mm×60 mm.

The thus fabricated secondary battery was subjected to a charging and discharging test under the following conditions:

The secondary battery was charged with a current of 0.4 mA/cm$^2$ of the positive electrode until the voltage of the battery reached 3.7 V. The battery was then allowed to stand for 10 minutes, without charging or discharging. The battery was then allowed to be discharged with a current of 0.4 mA/cm$^2$ of the positive electrode until the voltage of the battery was reduced to 2.0 V.

The results are shown in TABLE 3.

Example 11

The procedure for Example 5 was repeated except that the crystalline vanadium pentoxide employed in the fabrication of the positive electrode in Example 5 was replaced by finely-divided $LiMn_3O_6$ particles with an average particle size of 1 μm, and a maximum particle size of 3 μm, whereby a secondary battery No. 11 according to the present invention was fabricated.

The thus fabricated secondary battery was subjected to the same charging and discharging test by using the same commercially available charging and discharging test apparatus under the same test conditions as in Example 1.

The results are shown in TABLE 3.

TABLE 3

|  |  | Ex. 5 | Ex. 6 | Ex. 7 | Ex. 8 | Ex. 9 | Ex. 10 | Ex. 11 |
|---|---|---|---|---|---|---|---|---|
| Energy | (mWh/g) | 390.7 | 356.2 | 397.5 | 332.5 | 391.5 | 310.1 | 399 |
| Density | (mWh/cm³) | 699.4 | 502.1 | 700.1 | 574.3 | 258.4 | 542.8 | 701 |
| Discharge | (mAh/g) | 120.2 | 111.3 | 122.3 | 109.0 | 131.8 | 106.2 | 122 |
| Capacity | (mAh/cm³) | 215.2 | 156.9 | 215.4 | 188.3 | 87.7 | 185.9 | 217 |
| Cycle Life (times) |  | 300< | 300< | 300< | 300< | 300< | 300< | 300< |
| Density (g/cm³) of Positive Electrode |  | 1.79 | 1.41 | 1.76 | 1.73 | 1.80 | 1.75 | 1.80 |

* "300<" in the above denotes more than 300 times.

Example 12

A carbon material composed of (a) 9 parts by weight of a carbon fiber with a turbostratic structure with an interplanar space d002 of 3.45 Å and a particle size Lc of 15 Å, and (b) 1 part by weight of a graphite with an interplanar space d002 of 3.35 Å and a particle size Lc of 100 Å or more was prepared.

9 parts by weight of the above carbon material and 1 part by weight of finely-divided teflon particles were mixed and kneaded. The kneaded mixture was then applied to a 200-mesh stainless steel wire screen with the application of pressure thereto, and press-molded, whereby a 4×7 cm sheet-shaped negative electrode provided with a 250 μm thick negative active material layer was prepared.

5 parts by weight of finely-divided crystalline vanadium pentoxide and 5 parts by weight of finely-divided polyamine particles were mixed and kneaded. This kneaded mixture was applied to a 200-mesh stainless steel screen by the application of pressure thereto, whereby a 4×7 cm sheet-shaped positive electrode provided with a 120 μm thick positive electrode active material layer was fabricated, with the content of the polyaniline in the positive electrode being 50 wt. %, and the density thereof being 1.42 g/cm³.

The above prepared negative electrode, positive electrode, and a porous polypropylene separator were impregnated with the same electrolytic solution as prepared in Example 9, and were then exposed to the light of a high-pressure mercury lamp, whereby each of the electrodes and the separator was compounded with the polymer solid electrolyte in the electrolytic solution.

These composite members were laminated and sealed under reduced pressure by use of a thermofusible polypropylene frame, whereby a secondary battery No. 12 according to the present invention was fabricated, which was a thin and flat secondary battery with a size of 4 cm×7 cm.

The thus fabricated secondary battery was subjected to the following charging and discharging tests:

The secondary battery was charged with a current of 5 mA until the voltage of the battery reached 3.6 V. The battery was then allowed to stand for 10 minutes, without charging or discharging. The battery was then allowed to be discharged with a current of 5 mA until the voltage of the battery was reduced to 2.0 V.

The discharge capacity of the battery in the above charging and discharging was measured. The result is shown in TABLE 4.

The above charging and discharging test was repeated by changing the charging and discharging current of 5 mA to 20 mA, and then to 50 mA. The results are shown in TABLE 4.

Example 13

The procedure for the fabrication of the secondary battery in Example 12 was repeated except that the positive electrode employed in Example 12 was replaced by a positive electrode which was fabricated as follows, whereby a sheet-shaped secondary battery No. 13, with a size of 4 cm×7 cm, according to the present invention was fabricated:

6 parts by weight of finely-divided crystalline vanadium pentoxide and 4 parts by weight of finely-divided polyamine particles were mixed and kneaded. This kneaded mixture was applied to a 200-mesh stainless steel screen by the application of pressure thereto, whereby a 4×7 cm sheet-shaped positive electrode provided with a 120 μm thick positive electrode active material layer was fabricated, with the content of the polyaniline in the positive electrode being 40 wt. %, and the density thereof being 1.61 g/cm³.

The thus fabricated secondary battery was subjected to the following charging and discharging tests:

The secondary battery was charged with a current of 5 mA until the voltage of the battery reached 3.6 V. The battery was then allowed to stand for 10 minutes, without charging or discharging. The battery was then allowed to be discharged with a current of 5 mA until the voltage of the battery was reduced to 2.0 V.

The discharge capacity of the battery in the above charging and discharging was measured. The result is shown in TABLE 4.

The above charging and discharging test was repeated by changing the charging and discharging current of 5 mA to 20 mA, and then to 50 mA. The results are shown in TABLE 4.

Example 14

The procedure for the fabrication of the secondary battery in Example 12 was repeated except that the positive electrode employed in Example 12 was replaced by a positive electrode which was fabricated as follows, whereby a sheet-shaped secondary battery No. 13, with a size of 4 cm×7 cm, according to the present invention was fabricated:

7 parts by weight of finely-divided crystalline vanadium pentoxide and 3 parts by weight of finely-divided polyamine particles were mixed and kneaded. This kneaded mixture was applied to a 200-mesh stainless steel screen by the application of pressure thereto, whereby a 4×7 cm sheet-shaped positive electrode provided with a 120 μm thick positive electrode active material layer was fabricated, with the content of the polyaniline in the positive electrode being 30 wt. %, and the density thereof being 1.80 g/cm$^3$.

The thus fabricated secondary battery was subjected to the following charging and discharging tests:

The secondary battery was charged with a current of 5 mA until the voltage of the battery reached 3.6 V. The battery was then allowed to stand for 10 minutes, without charging or discharging. The battery was then allowed to be discharged with a current of 5 mA until the voltage of the battery was reduced to 2.0 V.

The discharge capacity of the battery in the above charging and discharging was measured. The result is shown in TABLE 4.

The above charging and discharging test was repeated by changing the charging and discharging current of 5 mA to 20 mA, and then to 50 mA. The results are shown in TABLE 4.

Comparative Example 3

The procedure for the fabrication of the secondary battery in Example 12 was repeated except that the positive electrode employed in Example 12 was replaced by a positive electrode which was fabricated as follows, whereby a comparative sheet-shaped secondary battery No. 3, with a size of 4 cm×7 cm, was fabricated:

7 parts by weight of finely-divided crystalline vanadium pentoxide, 1 part by weight of graphite, and 1 part by weight of finely-divided teflon particles were mixed and kneaded. This kneaded mixture was applied to a 200-mesh stainless steel screen by the application of pressure thereto, whereby a 4×7 cm sheet-shaped positive electrode provided with a 120 μm thick positive electrode active material layer was fabricated.

The thus fabricated secondary battery was subjected to the following charging and discharging tests.

The secondary battery was charged with a current of 5 mA until the voltage of the battery reached 3.6 V. The battery was then allowed to stand for 10 minutes, without charging or discharging. The battery was then allowed to be discharged with a current of 5 mA until the voltage of the battery was reduced to 2.0 V.

The discharge capacity of the battery in the above charging and discharging was measured. The result is shown in TABLE 4.

The above charging and discharging test was repeated by changing the charging and discharging current of 5 mA to 20 mA, and then to 50 mA. The results are shown in TABLE 4.

TABLE 4

| | | Ex. 12 | Ex. 13 | Ex. 14 | Comp. Ex. 3 |
|---|---|---|---|---|---|
| Discharge Capacity (mAh/cm$^3$) | Discharge Current 5 mA | 128 | 142 | 160 | 141 |
| | Discharge Current 20 mA | 121 | 133 | 148 | 98 |
| | Discharge Current 50 mA | 104 | 114 | 120 | 36 |

Example 15

A carbon material composed of (a) 85 parts by weight of a carbon fiber with a turbostratic structure with an interplanar space d002 of 3.54 Å and a particle size Lc of 18 Å, and (b) 1 part by weight of a graphite with an interplanar space d002 of 3.36 Å and a particle size Lc of 1000 Å or more was prepared.

10 parts by weight of the above carbon material and 1 part by weight of finely-divided teflon particles were mixed and kneaded. The kneaded mixture was then applied to a 200-mesh stainless steel screen with the application of pressure thereto, and press-molded, whereby a 4×7 cm sheet-shaped negative electrode provided with a 250 μm thick negative active material layer was prepared.

6 parts by weight of finely-divided polypyrrole particles and 4 parts by weight of LiMn$_3$O$_6$ were mixed and kneaded. This kneaded mixture was applied to a 20-mesh stainless steel screen by the application of pressure thereto, whereby a 4×7 cm sheet-shaped positive electrode provided with a 120 μm thick positive electrode active material layer was fabricated, with the content of the polypyrrole in the positive electrode being 60 wt. %.

The above prepared negative electrode, positive electrode, and a porous polypropylene separator were impregnated with the same electrolytic solution as prepared in Example 9, and were then exposed to the light of a high-pressure mercury lamp, whereby each of the electrodes and the separator was compounded with the polymer solid electrolyte in the electrolytic solution.

These composite members were laminated and sealed under reduced pressure by use of a thermofusible polypropylene frame, whereby a secondary battery No. 15 according to the present invention was fabricated, which was a thin and flat secondary battery with a size of 4 cm×7 cm.

The thus fabricated secondary battery was subjected to the following charging and discharging tests:

The secondary battery was charged with a current of 5 mA until the voltage of the battery reached 3.5 V. The battery was then allowed to stand for 10 minutes, without charging or discharging. The battery was then allowed to be discharged with a current of 5 mA until the voltage of the battery was reduced to 1.5 V.

The discharge capacity of the battery in the above charging and discharging was measured. The result is shown in TABLE 5.

The above charging and discharging test was repeated by changing the charging and discharging current of 5 mA to 20 mA, and then to 50 mA. The results are shown in TABLE 4.

Example 16

A carbon material composed of (a) 85 parts by weight of a carbon fiber with a turbostratic structure with an interplanar space d002 of 3.54 Å and a particle size Lc of 18 Å, and (b) 1 part by weight of a graphite with an interplanar space d002 of 3.36 Å and a particle size Lc of 1000 Å or more was prepared.

10 parts by weight of the above carbon material and 1 part by weight of finely-divided teflon particles were mixed and kneaded. The kneaded mixture was then applied to a 200-mesh stainless steel screen with the application of pressure thereto, and press-molded, whereby a 4×7 cm sheet-shaped negative electrode provided with a 250 μm thick negative active material layer was prepared.

4 parts by weight of finely-divided polypyrrole particles and 6 parts by weight of LiMn$_3$O$_6$ were mixed and kneaded. This kneaded mixture was applied to a 200-mesh stainless steel screen by the application of pressure thereto, whereby a 4×7 cm sheet-shaped positive electrode provided with a 120 μm thick positive electrode active material layer was fabricated, with the content of the polypyrrole in the positive electrode being 60 wt. %.

The above prepared negative electrode, positive electrode, and a porous polypropylene separator were impregnated with the same electrolytic solution as prepared in Example 9, and were then exposed to the light of a high-pressure mercury lamp, whereby each of the electrodes and the separator was compounded with the polymer solid electrolyte in the electrolytic solution.

These composite members were laminated and sealed under reduced pressure by use of a thermofusible polypropylene frame, whereby a secondary battery No. 15 according to the present invention was fabricated, which was a thin and flat secondary battery with a size of 4 cm×7 cm.

The thus fabricated secondary battery was subjected to the following charging and discharging tests:

The secondary battery was charged with a current of 5 mA until the voltage of the battery reached 3.5 V. The battery was then allowed to stand for 10 minutes, without charging or discharging. The battery was then allowed to be discharged with a current of 5 mA until the voltage of the battery was reduced to 1.5 V.

The discharge capacity of the battery in the above charging and discharging was measured. The result is shown in TABLE 5.

The above charging and discharging test was repeated by changing the charging and discharging current of 5 mA to 20 mA, and then to 50 mA. The results are shown in TABLE 5.

TABLE 5

|  |  | Ex. 15 | Ex. 16 |
|---|---|---|---|
| Discharge Capacity (mAh/cm$^3$) | Discharge Current 5 mA | 250 | 320 |
|  | Discharge Current 20 mA | 234 | 301 |
|  | Discharge Current 50 mA | 212 | 265 |

Example 17

4 g of polyaniline and 8 g of a finely-divided crystalline vanadium pentoxide with an average particle size of 0.6 μm and a maximum particle size of 2 μm were mixed. The mixture was then subjected to a mechanochemical mixing in a commercially available hybridizer (made by Narakikai Co., Ltd.) for 10 minutes, whereby a positive electrode active material was prepared.

The procedure for fabricating the secondary battery No. 1 according to the present invention in Example 1 was repeated except that the positive electrode active material employed in Example 1 was replaced by 30 mg of the above-prepared positive electrode active material, whereby a secondary battery No. 17 according to the present invention was fabricated.

The thus fabricated secondary battery was subjected to the same charging and discharging test under the same conditions as in Example 1. The results are shown in the following TABLE 6:

TABLE 6

|  |  | Ex. 17 |
|---|---|---|
| Energy | (mWh/g) | 466.9 |
| Density | (mWh/cm$^3$) | 320 |
| Discharge | (mAh/g) | 145.5 |
| Capacity | (mAh/cm$^3$) | 99.8 |
| Cycle Life (times) |  | 300< |

* "300<" in the above denotes more than 300 times.

Example 18

13 g of polyaniline synthesized by chemical polymerization, 30.3 g of a finely-divided crystalline vanadium pentoxide with an average particle size of 0.8 μm and a maximum particle size of 1.5 μm, and 87 g of N-methylpyrrolidone were mixed and dispersed under an inert atmosphere in a roll mill, whereby a coating liquid for the fabrication of a positive electrode was prepared.

The thus prepared coating liquid was applied with a thickness of 150 μm to a 20 μm thick stainless steel foil serving as a collector by a wire bar, and was then dried at 100° C. for 15 minutes, whereby a positive electrode No. 18 according to the present invention which comprised an active material layer with a thickness of 30 μm was formed on the collector was fabricated.

By using the above prepared positive electrode, a lithium plate serving as a negative electrode, and an electrolytic solution prepared by dissolving 3 moles of LiBF$_4$ in a 1 liter of a mixed solvent of propylene carbonate and DME in the respective weight ratio of 7:3, a secondary battery No. 18 according to the present invention was fabricated.

The thus fabricated secondary battery was subjected to the following charging and discharging tests by using the same commercially available charging and discharging test apparatus (Trademark "HJ-201B" made by Hokutodenko Co., Ltd.) as employed in Example 1:

The secondary battery was charged with a current of 0.2 mA/cm$^2$ of the positive electrode until the voltage of the battery reached 3.7 V. The battery was then allowed to stand for 1 hour, without charging or discharging. The battery was then allowed to be discharged with a current of 0.2 mA/cm$^2$ of the positive electrode until the voltage of the battery was reduced to 2.8 V.

This charging and discharging was repeated, and the discharge capacities (mAh/cm$^3$) of the positive electrode at the 3rd cycle and 20th cycle of the charging and discharging were measured. The results are shown in TABLE 7.

Furthermore, several samples of the above-mentioned positive electrode composed of the collector and the positive active material layer formed on the collector were prepared and subjected to the following durability tests:

In order to assess the degree of the flexibility of the positive electrode active material layer, a sample of the positive electrode was bent at an angle of 90° repeatedly until the positive electrode active material layer was peeled away from the collector, and the number of the repetition of the bending until the peeling off of the positive electrode active material layer took place was counted. In this case, however, no peeling of the active material layer off the collector took place even though the bending was repeated 50 times.

A sample of the electrode was immersed in the previously mentioned electrolytic solution for 20 hours and the density of the positive electrode active material layer was then measured. The result was 1.3 g/cm$^3$.

In order to assess the degree of the close contact of the positive electrode active material layer with the collector, a sample of the positive electrode was bent at an angle of 90° ten times to see whether or not the positive electrode active material layer was peeled away from the collector. In TABLE 7, mark "o" denotes no occurrence of such peeling off of the positive electrode active material layer, and mark "x" denotes the occurrence of such peeling off of the positive electrode active material layer.

The results of the above tests are shown in TABLE 7.

Example 19

13 g of polyaniline synthesized by chemical polymerization, 7 g of a finely-divided crystalline vanadium pentoxide with an average particle size of 0.8 μm and a maximum particle size of 1.5 μm, and 87 g of N-methylpyrrolidone were mixed and dispersed under an inert atmosphere in a roll mill, whereby a coating liquid for the fabrication of a positive electrode was prepared.

A positive electrode No. 19 according to the present invention was prepared from the above prepared coating liquid in the same manner as in Example 18.

The procedure for fabricating the secondary battery No. 18 in Example 18 was repeated except that the positive electrode employed in Example 18 was replaced by the above prepared positive electrode, whereby a secondary battery No. 19 according to the present invention was fabricated.

The thus fabricated secondary battery was subjected to the same charging and discharging tests and to the same durability tests with respect to the positive electrode active material thereof under the same conditions as in Example 18.

The results are shown in TABLE 7.

Example 20

13 g of polyaniline synthesized by chemical polymerization, 52 g of a finely-divided crystalline vanadium pentoxide with an average particle size of 0.8 μm and a maximum particle size of 1.5 μm, and 87 g of N-methylpyrrolidone were mixed and dispersed under an inert atmosphere in a roll mill, whereby a coating liquid for the fabrication of a positive electrode was prepared.

A positive electrode No. 20 according to the present invention was prepared from the above prepared coating liquid in the same manner as in Example 18.

The procedure for fabricating the secondary battery No. 18 in Example 18 was repeated except that the positive electrode employed in Example 18 was replaced by the above prepared positive electrode, whereby a secondary battery No. 20 according to the present invention was fabricated.

The thus fabricated secondary battery was subjected to the same charging and discharging tests and to the same durability tests with respect to the positive electrode active material thereof under the same conditions as in Example 18.

The results are shown in TABLE 7.

Comparative Example 4

13 g of polyaniline synthesized by chemical polymerization, 150 g of a finely-divided crystalline vanadium pentoxide with an average particle size of 0.8 μm and a maximum particle size of 1.5 μm, and 160 g of N-methylpyrrolidone were mixed and dispersed under an inert atmosphere in a roll mill, whereby a coating liquid for the fabrication of a positive electrode was prepared.

A comparative positive electrode No. 4 comprising an active material layer formed on a collector was prepared from the above prepared coating liquid in the same manner as in Example 18.

However, the active material layer was so fragile that it was impossible to fabricate a comparative secondary battery. Accordingly it was impossible to measure the charging and discharging characteristics thereof. Therefore no data for this example is given in TABLE 7.

Comparative Example 5

13 g of polyaniline synthesized by chemical polymerization and 87 g of N-methylpyrrolidone were mixed and dispersed under an inert atmosphere in a roll mill, whereby a coating liquid for the fabrication of a positive electrode was prepared.

A comparative positive electrode No. 5 was prepared from the above prepared coating liquid in the same manner as in Example 18.

The procedure for fabricating the secondary battery No. 18 in Example 18 was repeated except that the positive electrode employed in Example 18 was replaced by the above prepared positive electrode, whereby a comparative secondary battery No. 5 was fabricated.

The thus fabricated comparative secondary battery was subjected to the same charging and discharging tests and to the same durability tests with respect to the positive electrode active material thereof under the same conditions as in Example 18.

The results are shown in TABLE 7.

Example 21

The procedure for fabricating the secondary battery No. 18 according to the present invention in Example 18 was repeated except that the finely-divided crystalline vanadium pentoxide with an average particle size of 0.8 μm and a maximum particle size of 1.5 μm employed in the positive electrode for the secondary battery No. 18 was replaced by a finely-divided crystalline vanadium pentoxide with an average particle size of 2.5 μm and a maximum particle size of 8 μm, and that the 20 μm thick stainless steel foil used as the collector for the secondary battery No. 18 was replaced by a 30 μm thick aluminum foil, whereby a secondary battery No. 21 according to the present invention was fabricated.

The thus fabricated secondary battery was subjected to the same charging and discharging tests and to the same durability tests with respect to the positive electrode active material thereof under the same conditions as in Example 18.

The results are shown in TABLE 7.

Example 22

16 g of polyaniline synthesized by chemical polymerization, 35 g of a finely-divided crystalline vanadium pentoxide with an average particle size of 2.5 μm and a maximum particle size of 8 μm, and 85 g of N-methylpyrrolidone were mixed and dispersed under an inert atmosphere in a roll mill, whereby a coating liquid for the fabrication of a positive electrode was prepared.

The procedure for fabricating the secondary battery No. 18 in Example 18 was repeated except that the positive electrode employed in Example 18 was replaced by the above prepared positive electrode, whereby a secondary battery No. 22 according to the present invention was fabricated.

The thus fabricated secondary battery was subjected to the same charging and discharging tests and to the same durability tests with respect to the positive electrode active material thereof under the same conditions as in example 18.

The results are shown in TABLE 7.

Example 23

10 g of polyaniline synthesized by chemical polymerization, 23.3 g of a finely-divided crystalline vanadium pentoxide with an average particle size of 2.5 μm and a maximum particle size of 8 μm, and 90 g of N-methyl-pyrrolidone were mixed and dispersed under an inert atmosphere in a roll mill, whereby a coating liquid for the fabrication of a positive electrode was prepared.

The thus prepared coating liquid was applied with a thickness of 150 μm to a 20 μm thick stainless steel foil serving as a collector by a wire bar, and was then dried at 100° C. for 15 minutes, whereby a positive electrode composed of a positive electrode active material layer with a thickness of 30 μm formed on the collector was prepared.

The procedure for fabricating the secondary battery No. 18 in Example 18 was repeated except that the positive electrode employed in Example 18 was replaced by the above prepared positive electrode, whereby a secondary battery No. 23 according to the present invention was fabricated.

The thus fabricated secondary battery was subjected to the same charging and discharging tests and to the same durability tests with respect to the positive electrode active material thereof under the same conditions as in example 18.

The results are shown in TABLE 7.

Comparative Example 6

The procedure for preparing the coating liquid for the fabrication of the positive electrode for the secondary battery No. 18 according to the present invention in Example 18 was repeated except that the vanadium pentoxide employed in Example 18 was replaced by a commercially available "fine grade" vanadium pentoxide with an average particle size of 10 μm and a maximum particle size of 100 μm (made by Shinko Kagaku Co., Ltd.), whereby a coating liquid for the fabrication of a positive electrode was prepared. The thus prepared coating liquid was not a uniform dispersion.

By use of this coating liquid, a positive electrode was fabricated in the same manner as in Example 18. The thus fabricated positive electrode was not uniform in quality.

The procedure for fabricating the secondary battery No. 18 in Example 13 was repeated except that the positive electrode employed in Example 18 was replaced by the above prepared positive electrode, whereby a comparative secondary battery No. 6 was fabricated.

The thus fabricated comparative secondary battery was subjected to the same charging and discharging tests and to the same durability tests with respect to the positive electrode active material thereof under the same conditions as in example 18. The results are shown in TABLE 7.

Comparative Example 7

5 g of polyaniline synthesized by chemical polymerization, 11.7 g of a finely-divided crystalline vanadium pentoxide with an average particle size of 2.5 μm and a maximum particle size of 8 μm, and 85 g of N-methyl-pyrrolidone were mixed and dispersed under an inert atmosphere in a roll mill, whereby a coating liquid for the fabrication of a positive electrode was prepared.

The thus prepared coating liquid was not a uniform dispersion.

By use of this coating liquid, a positive electrode was fabricated in the same manner as in Example 18. The thus fabricated positive electrode was not uniform in quality.

The procedure for fabricating the secondary battery No. 18 in Example 18 was repeated except that the positive electrode employed in Example 18 was replaced by the above prepared positive electrode, whereby a comparative secondary battery No. 7 was fabricated.

The thus fabricated comparative secondary battery was subjected to the same charging and discharging tests and to the same durability tests with respect to the positive electrode active material thereof under the same conditions as in Example 18. The results are shown in TABLE 7.

TABLE 7

| | | Ex. 18 | Ex. 19 | Ex. 20 | Ex. 21 | Ex. 22 | Ex. 23 | Comp. Ex. 5 | Comp. Ex. 6 | Comp. Ex. 7 |
|---|---|---|---|---|---|---|---|---|---|---|
| Discharge Capacity (mAh/cm$^3$) | 3rd cycle | 185 | 88 | 269 | 150 | 130 | 140 | 50 | 100 | 85 |
| | 20th cycle | 250 | 121 | 291 | 220 | 185 | 160 | 75 | 81 | 66 |
| Flexibility of Positive Electrode Active Material Layer *1) | | 50< | 50< | 47 | 50< | 50< | 50< | 50< | 15 | 3 |
| Density (g/cm$^3$) of Positive Electrode Active Material Layer *2) | | 1.3 | 1.1 | 2.1 | 1.3 | 1.4 | 1.3 | 0.8 | 1.3 | 1.0 |
| Close Contact of Positive Electrode Active Material Layer with Collector *3) | | o | o | o | o | o | o | o | o | X |

*1) A sample of the positive electrode was bent at an angle of 90° repeatedly until the positive electrode active material layer was peeled away from the collector, and the number of the repetition of the bending until the peeling off of the positive electrode active material layer took place was counted. For example, "50<" denotes that the positive electrode active material layer was not peeled off the collector even when the positive electrode was bent 50 times, and "47" denotes the occurrence of the peeling off at the 47th bending of the positive electrode.
*2) A sample of the electrode was immersed in the electrolytic solution for 20 hours and the density of the positive electrode active material layer was then measured.
*3) A sample of the positive electrode was bent at an angle of 90° ten times to see whether or not the positive electrode active material layer was peeled away from the collector. Mark "o" denotes no occurrence of such peeling off of the positive electrode active material layer, and mark "x" denotes the occurrence of such peeling off of the positive electrode active mterial layer.

Example 24

8 g of 3-octyl-thiophene, 8 g of a finely-divided crystalline vanadium pentoxide with an average particle size of 0.8 μm and a maximum particle size of 1.5 μm, and 92 g of toluene were mixed and dispersed under an inert atmosphere in a roll mill, whereby a coating liquid for the fabrication of a positive electrode was prepared.

The thus prepared coating liquid was applied with a thickness of 150 μm to a 20 μm thick stainless steel foil serving as a collector by a wire bar, and was then dried at 100° C. for 15 minutes, whereby a positive electrode composed of a positive electrode active material layer with a thickness of 30 μm formed on the collector was prepared.

The procedure for fabricating the secondary battery No. 18 in Example 18 was repeated except that the positive electrode employed in Example 18 was replaced by the above prepared positive electrode, whereby a secondary battery No. 24 according to the present invention was fabricated.

The thus fabricated secondary battery was subjected to the same charging and discharging tests in the same manner as in Example 18. The results were as follows:
Discharge capacity at 3rd cycle: 114 mAh/cm$^3$
Discharge capacity at 20th cycle: 115 mAh/cm$^3$
Discharge capacity at 200th cycle: 110 mAh/cm$^3$

Example 25

A carbon material composed of (a) a carbon powder with a turbostratic structure with an interplanar space d002 of 3.6 Å and (b) a graphite with an interplanar space d002 of 3.35 Å and a particle size Lc of 1000 Å or more in the respective parts-by-wight ratio of 7:2 was prepared.

9 parts by weight of the above carbon material and 1 part by weight of finely-divided teflon particles were mixed and kneaded. The kneaded mixture was then applied to a 200-mesh stainless steel screen with the application of pressure thereto, and press-molded, whereby a 4×7 cm sheet-shaped negative electrode provided with a 60 μm thick negative active material layer was prepared.

The same positive electrode as prepared in Example 18 was also prepared with a size of 4×7 cm.

A polymeric solid electrolyte composition liquid for preparing a viscoelastic, polymeric solid electrolyte was prepared by mixing the following components:

|  | Parts by Weight |
| --- | --- |
| Polymerizable compound of formula (Ia) $CH_2=CHCOO(CH_2CHO)_2C_2H_5$ H | 12.8 |
| Trimethylolpropane acrylate | 0.2 |
| Benzoin-iso-propyl ether | 0.1 |
| LiBF$_4$ | 20.0 |
| Ethylene carbonate | 48.0 |
| Dimethoxyethane | 19.0 |

The above prepared negative electrode, positive electrode, and a porous polypropylene separator were impregnated with the above prepared polymeric solid electrolyte composition liquid for preparing the viscoelastic, polymeric solid electrolyte and were then exposed to the light of a high-pressure mercury lamp, whereby each of the electrodes and the separator was compounded with the polymer solid electrolyte in the electrolytic solution.

These composite members were laminated and sealed under reduced pressure by use of a thermofusible polypropylene frame, whereby a secondary battery No. 25 according to the present invention was fabricated, which was a thin and flat secondary battery with a size of 4 cm×7 cm.

The thus fabricated secondary battery was subjected to the following charging and discharging tests:

The secondary battery was charged with a current of 4 mA until the voltage of the battery reached 3.6 V. The battery was then allowed to stand for 10 minutes, without charging or discharging. The battery was then allowed to be discharged with a current of 4 mA until the voltage of the battery was reduced to 2.5 V.

This charging and discharging cycle was repeated 10, 100, 200, and 300 times, and the discharge capacity (mAh) at each cycle was measured. The results are shown in TABLE 8.

Example 26

The procedure for fabricating the secondary battery No. 25 according to the present invention in Example 25 was repeated except that the polymeric solid electrolyte composition liquid employed in Example 25 was replaced by a polymeric solid electrolyte composition liquid with the following formulation, whereby a secondary battery No. 26 according to the present invention was fabricated, which was a thin and flat secondary battery with a size of 4 cm×7 cm:

|  | Parts by Weight |
| --- | --- |
| Polymerizable compound of formula (Ia) $CH_2=CHCOOCH_2-\underset{O}{\overset{H}{\diagup\!\!\!\diagdown}}$ | 12.8 |
| Trimethylolpropane acrylate | 0.2 |
| Benzoin-iso-propyl ether | 0.1 |
| LiBF$_4$ | 20.0 |
| Ethylene carbonate | 48.0 |
| Dimethoxyethane | 19.0 |

The thus fabricated secondary battery was subjected to the following charging and discharging tests:

The secondary battery was charged with a current of
The secondary battery was charged with a current of 4 mA until the voltage of the battery reached 3.6 V. The battery was then allowed to stand for 10 minutes, without charging or discharging. The battery was then allowed to be discharged with a current of 4 mA until the voltage of the battery was reduced to 2.5 V.

This charging and discharging cycle was repeated 10, 100, 200, and 300 times, and the discharge capacity (mAh) at each cycle was measured. The results are shown in TABLE 8.

Example 27

A mixture of BC$_2$N, a commercially available graphite (Trademark "Lonza Graphite KS6" made by Lonza Co., Ltd.), and finely-divided teflon particles in the respective parts-by-wight ratio of 7:2:1 was kneaded. The kneaded mixture was then applied to a 200-mesh stainless steel screen with the application of pressure thereto, and press-molded, whereby a 4×7 cm sheet-shaped negative electrode provided with a 150 μm thick negative active material layer was prepared.

The procedure for fabricating the secondary battery No. 25 according to the present invention in Example 25 was repeated except that the negative electrode employed in Example 25 was replaced by the above prepared negative electrode, whereby a secondary battery No. 27 according to the present invention was fabricated, which was a thin and flat secondary battery with a size of 4 cm×7 cm.

The thus fabricated secondary battery was subjected to the following charging and discharging tests:

The secondary battery was charged with a current of 4 mA until the voltage of the battery reached 3.6 V. The battery was then allowed to stand for 10 minutes, without charging or discharging. The battery was then allowed to be discharged with a current of 4 mA until the voltage of the battery was reduced to 2.5 V.

This charging and discharging cycle was repeated 10, 100, 200, and 300 times, and the discharge capacity (mAh) at each cycle was measured. The results are shown in TABLE 8.

TABLE 8

| Charging-Discharging Cycles | Ex. 25 | Ex. 26 | Ex. 27 |
| --- | --- | --- | --- |
| 10 | 18.5 mAh | 17.9 mAh | 17.4 mAh |
| 100 | 18.0 mAh | 17.6 mAh | 17.0 mAh |
| 200 | 17.8 mAh | 17.4 mAh | 16.9 mAh |
| 300 | 17.5 mAh | 17.3 mAh | 16.9 mAh |

Example 28

15 g of polyaniline synthesized by chemical polymerization, 22.5 g of a finely-divided crystalline vanadium pentoxide with an average particle size of 0.6 μm and a maximum particle size of 1.2 μm, and 87 g of N-methylpyrrolidone were mixed and dispersed under an inert atmosphere in a roll mill, whereby a coating liquid for the fabrication of a positive electrode was prepared.

A positive electrode No. 28 according to the present invention was prepared from the above prepared coating liquid in the same manner as in Example 18.

The procedure for fabricating the secondary battery No. 18 according to the present invention in Example 18 was repeated except that the positive electrode employed in Example 18 was replaced by the above prepared positive electrode, whereby a secondary battery No. 28 according to the present invention was fabricated.

The thus fabricated secondary battery was subjected to the same charging and discharging tests and to the same durability tests with respect to the positive electrode active material thereof under the same conditions as in Example 18. The results are shown in TABLE 9.

Example 29

15 g of polyaniline synthesized by chemical polymerization, 35 g of a finely-divided crystalline vanadium pentoxide with an average particle size of 0.6 μm and a maximum particle size of 1.2 μm, and 85 g of N-methylpyrrolidone were mixed and dispersed under an inert atmosphere in a roll mill, whereby a coating liquid for the fabrication of a positive electrode was prepared.

A positive electrode No. 29 according to the present invention was prepared from the above prepared coating liquid in the same manner as in Example 18.

The procedure for fabricating the secondary battery No. 18 according to the present invention in Example 18 was repeated except that the positive electrode employed in Example 18 was replaced by the above prepared positive electrode, whereby a secondary battery No. 29 according to the present invention was fabricated.

The thus fabricated secondary battery was subjected to the same charging and discharging tests and to the same durability tests with respect to the positive electrode active material thereof under the same conditions as in Example 18. The results are shown in TABLE 9.

Example 30

14 g of polyaniline synthesized by chemical polymerization, 42 g of a finely-divided crystalline vanadium pentoxide with an average particle size of 0.6 μm and a maximum particle size of 1.2 μm, and 86 g of N-methylpyrrolidone were mixed and dispersed under an inert atmosphere in a roll mill, whereby a coating liquid for the fabrication of a positive electrode was prepared.

A positive electrode No. 30 according to the present invention was prepared from the above prepared coating liquid in the same manner as in Example 18.

The procedure for fabricating the secondary battery No. 18 according to the present invention in Example 18 was repeated except that the positive electrode employed in Example 18 was replaced by the above prepared positive electrode, whereby a secondary battery No. 30 according to the present invention was fabricated.

The thus fabricated secondary battery was subjected to the same charging and discharging tests and to the same durability tests with respect to the positive electrode active material thereof under the same conditions as in Example 18. The results are shown in TABLE 9.

Example 31

12 g of polyaniline synthesized by chemical polymerization, 48 g of a finely-divided crystalline vanadium pentoxide with an average particle size of 0.6 μm and a maximum particle size of 1.2 μm, and 88 g of N-methylpyrrolidone were mixed and dispersed under an inert atmosphere in a roll mill, whereby a coating liquid for the fabrication of a positive electrode was prepared.

A positive electrode No. 31 according to the present invention was prepared from the above prepared coating liquid in the same manner as in Example 18.

The procedure for fabricating the secondary battery No. 18 according to the present invention in Example 18 was repeated except that the positive electrode employed in Example 18 was replaced by the above prepared positive electrode, whereby a secondary battery No. 31 according to the present invention was fabricated.

The thus fabricated secondary battery was subjected to the same charging and discharging tests and to the same durability tests with respect to the positive electrode active material thereof under the same conditions as in Example 18. The results are shown in TABLE 9.

Example 32

10 g of polyaniline synthesized by chemical polymerization, 56.7 g of a finely-divided crystalline vanadium pentoxide with an average particle size of 0.6 μm and a maximum particle size of 1.2 μm, and 90 g of N-methylpyrrolidone were mixed and dispersed under an inert atmosphere in a roll mill, whereby a coating liquid for the fabrication of a positive electrode was prepared.

A positive electrode No. 33 according to the present invention was prepared from the above prepared coating liquid in the same manner as in Example 18.

The procedure for fabricating the secondary battery No. 18 according to the present invention in Example 18 was repeated except that the positive electrode employed in Example 18 was replaced by the above prepared positive electrode, whereby a secondary battery No. 32 according to the present invention was fabricated.

The thus fabricated secondary battery was subjected to the same charging and discharging tests and to the same durability tests with respect to the positive electrode active material thereof under the same conditions as in Example 18. The results are shown in TABLE 9.

Comparative Example 8

91 g of a finely-divided crystalline vanadium pentoxide with an average particle size of 0.6 μm and a maximum particle size of 1.2 μm, 6 g of graphite, 9 g of polyvinylidene fluoride, and 66 g of N-methylpyrrolidone were mixed and dispersed under an inert atmosphere in a roll mill, whereby a coating liquid for the fabrication of a positive electrode was prepared.

A comparative positive electrode No. 8 was prepared from the above prepared coating liquid in the same manner as in Example 18.

The procedure for fabricating the secondary battery No. 18 according to the present invention in Example 18 was repeated except that the positive electrode employed in Example 18 was replaced by the above prepared positive electrode, whereby a comparative secondary battery No. 8 was fabricated.

The thus fabricated comparative secondary battery was subjected to the same charging and discharging tests and to the same durability tests with respect to the positive electrode active material thereof under the same conditions as in Example 18. The results are shown in TABLE 9.

TABLE 9

| Properties of Positive Electrode | Ex. 28 | Ex. 29 | Ex. 30 | Ex. 31 | Ex. 32 | Comp. Ex. 8 |
| --- | --- | --- | --- | --- | --- | --- |
| Content (wt. %) of $V_2O_5$ in Positive Electrode | 60 | 70 | 75 | 80 | 85 | — |
| Density of Positive Electrode (g/cm$^3$) | 1.5 | 1.8 | 1.9 | 2.1 | 2.3 | 2.4 |
| Discharge Capacity (mAh/cm$^3$) of Positive Electrode after 20th Charging-Discharging Cycle | 205 | 251 | 268 | 297 | 321 | 315 |
| Flexibility of Positive Electrode Active Material Layer *1) | 50< | 50< | 50< | 48 | 40 | 2 |
| Close Contact of Positive Electrode Active Material Layer with Collector *2) | o | o | o | o | o | x |

*1) A sample of the positive electrode was bent at an angle of 90° repeatedly until the positive electrode active material layer was peeled away from the collector, and the number of the repetition of the bending until the peeling off of the positive electrode active material layer took place was counted. For example, "50<" denotes that the positive electrode active material layer was not peeled off the collector even when the positive electrode was bent 50 times, and "48" denotes the occurrence of the peeling off at the 48th bending of the positive electrode.
*2) A sample of the positive electrode was bent at an angle of 90° ten times to see whether or not the positive electrode active material layer was peeled away from the collector. Mark "o" denotes no occurrence of such peeling off of the positive electrode active material layer, and mark "x" denotes the occurrence of such peelling off of the positive electrode active material layer.

What is claimed is:

1. A positive electrode comprising a film-shaped composite active material, which comprises a conducting polymer serving as a first active material, and an electrochemical active material serving as a second active material which is uniformly dispersed in the shape of particles in said conducting polymer, with the parts-by-weight ratio of said second active material to said first active material being 3 to 9 parts of said second active material to 7 to 1 part of said first active material, when the total of said first active material and said second active material is 10 parts.

2. The positive electrode as claimed in claim 1, wherein said electrochemical active material is an inorganic material.

3. The positive electrode as claimed in claim 1, wherein said film-shaped composite active material has a density of 1.0 to 3.5 g/cm$^3$.

4. The positive electrode as claimed in claim 1, wherein said electrochemical active material has an average particle size of 3 μm or less, and a maximum particle size of 10 μm or less.

5. The positive electrode as claimed in claim 1, wherein said conducting polymer serving as a first active material has a discharging potential which is higher than the charging potential of said electrochemical active material serving as a second active material.

6. The positive electrode as claimed in claim 1, wherein said conducting polymer serving as a first active material is polyaniline.

7. The positive electrode as claimed in claim 1, wherein said conducting polymer serving as a first active material is a solvent-soluble conducting polymer.

8. A secondary battery comprising a positive electrode comprising a film-shaped composite active material, which comprises at least one conducting polymer serving as a first active material, and at least one electrochemical active material serving as a second active material which is uniformly dispersed in the shape of particles in said conducting polymer, with the parts-by-weight ratio of said second active material to said first active material being 3 to 9 parts of said second active material to 7 to 1 part of said first active material when the total of said first active material and said second active material is 10 parts; an electrolyte; and a negative electrode.

9. The secondary battery as claimed in claim 8, wherein said electrolyte is a polymeric solid electrolyte.

10. The secondary battery as claimed in claim 9, wherein said polymeric solid electrolyte is a viscoelastic, polymeric solid electrolyte.

11. The secondary battery as claimed in claim 10, wherein said negative electrode comprises an intercalation active material.

12. The secondary battery as claimed in claim 11, wherein said intercalation active material is a carbon material.

13. The secondary battery as claimed in claim 12, wherein said carbon material comprises graphite.

14. The secondary battery as claimed in claim 8 is a flat secondary battery.

15. A positive electrode comprising a film-shaped composite active material, wherein said film-shaped composite active material comprises:

(a) a conducting polymer serving as a first active material; and
(b) an electrochemical active material serving as a second active material;
wherein particles of said second active material are uniformly dispersed in said conducting polymer, and a parts-by-weight ratio of said second active material to said first active material is from 3:7 to 9:1, with a total amount of said first active material and said second active material being 10 parts, and
wherein said electrochemical active material is bound in said film-shaped composite active material solely by said conductive polymer.

16. The positive electrode as claimed in claim 15, wherein said electrochemical active material is an inorganic material.

17. The positive electrode as claimed in claim 15, wherein said film-shaped composite active material has a density of 1.0 to 3.5 g/cm$^3$.

18. The positive electrode as claimed in claim 15, wherein said electrochemical active material has an average particle size of 3 μm or less, and a maximum particle size of 10 μm or less.

19. The positive electrode as claimed in claim 15, wherein said conducting polymer serving as a first active material is polyaniline.

20. A secondary battery comprising an electrolyte, a negative electrode and a positive electrode, said positive electrode comprising a film-shaped composite active material,
wherein sad film-shaped composite active material comprises:
(a) a conducting polymer serving as a first active material; and
(b) an electrochemical active material serving as a second active material;
wherein particles of said second active material are uniformly dispersed in said conducting polymer, and a parts-by-weight ratio of said second active material to said first active material is from 3:7 to 9:1, with a total amount of said first active material and said second active material being 10 parts, and
wherein said electrochemical active material is bound in said film-shaped composite active material solely by said conductive polymer.

21. The secondary battery as claimed in claim 20, wherein said electrolyte is a polymeric solid electrolyte.

22. The secondary battery as claimed in claim 20, wherein said negative electrode comprises an intercalation active material.

23. The secondary battery as claimed in claim 22, wherein said intercalation active material is a carbon material.

\* \* \* \* \*

UNITED STATES PATENT AND TRADEMARK OFFICE
CERTIFICATE OF CORRECTION

PATENT NO. : 5,437,943
DATED : August 1, 1995
INVENTOR(S) : Toshishige FUJII et al It is certified that error appears in the above-indentified patent and that said Letters Patent is hereby corrected as shown below:

Column 1, Line 12, "in the shaped" should read --in the shape--.

Column 4, Line 25, "by using he above" should read --by using the above--.

Column 5, line 38, "effects is the first" should read --effects as the first--.

Column 11, Line 31-32, "such as Li(-), Na(-), or K(-); and $(R^4N)(-)$," should read --such as Li(+), Na(+), or K(+); and $(R^4N)(+)$--.

Column 11, Line 36, "$LiClO_4$, $NaClO_6$" should read --$LiClO_4$, $NaClO_4$--.

Column 11, Line 36, "$KSbF_6,,$" should read --$KSbF_6,$--.

Column 11, Line 37, "$[(n-Bu)_4N](-)AsF_6-, [(n-Bu)_4N](-)$", should read --$[(n-Bu)_4N](+)AsF_6-, [(n-Bu)_4N](+)$--.
Column 11, line 37, "$KClO_6,$" should read --$KClO_4,$--.

UNITED STATES PATENT AND TRADEMARK OFFICE
CERTIFICATE OF CORRECTION

PATENT NO. : 5,437,943
DATED : August 1, 1995
INVENTOR(S) : Toshishige FUJII et al It is certified that error appears in the above-indentified patent and that said Letters Patent is hereby corrected as shown below:

Column 11, Line 38, "$LiBF_6$" should read --$LiBF_4$--.

Column 17, Line 39, "as in Example a 1" should read --as in Example 1--.

Column 17, Line 62, "Benzoin-iso-propyl other" should read --Benzoin-iso-propyl ether--.

Column 18, Line 54, "secondary" should read --battery--.

Column 27, Line 37, "as in example 18" should read --as in Example 18--.

Column 28, Last line of *3), "active mterial" should read --active material--.

Column 29, Line 30, "parts-by-wight ration" should read --parts-by-weight-ratio--.

UNITED STATES PATENT AND TRADEMARK OFFICE
CERTIFICATE OF CORRECTION

PATENT NO. : 5,437,943
DATED : August 1, 1995
INVENTOR(S) : Toshishige FUJII et al It is certified that error appears in the above-indentified patent and that said Letters Patent is hereby corrected as shown below:

Column 29, Line 50-51, "$CH_2=CHCOO\ (CH_2CHO)_2C_2H_5$" should read $--CH_2=CHOO(CH_2CHO)_2C_2H_5--$.
$$\begin{array}{c} H \\ | \\ H \end{array}$$

Column 30, Line 45, please delete "The secondary battery was charged with a current of".

Column 30, Line 61, "parts-by-wight" should read --parts-by-weight--.

Column 34, Line 14, "than the charging potential" should read --than the discharging potential--.

Column 36, Line 5, "sad" should read --said--.

Signed and Sealed this

Nineteenth Day of November, 1996

Attest:

BRUCE LEHMAN

*Attesting Officer*    *Commissioner of Patents and Trademarks*